455-611 AU 233 EX
FIP8106 XR 3,449,577

June 10, 1969 H. W. KOGELNIK 3,449,577

CONTROLLED TRANSMISSION OF WAVES THROUGH INHOMOGENEOUS MEDIA

Filed Oct. 23, 1965 Sheet 1 of 8

INVENTOR
H. W. KOGELNIK
BY Wilford L. Wisner
ATTORNEY

June 10, 1969 H. W. KOGELNIK 3,449,577

CONTROLLED TRANSMISSION OF WAVES THROUGH INHOMOGENEOUS MEDIA

Filed Oct. 23, 1965

3,449,577

CONTROLLED TRANSMISSION OF WAVES THROUGH INHOMOGENEOUS MEDIA

Herwig W. Kogelnik, Summit, N.J., assignor to Bell Telephone Laboratories, Incorporated, New York, N.Y., a corporation of New York Filed Oct. 23, 1965, Ser. No. 503,287
Int. Cl. H04b 9/00
U.S. Cl. 250—199 26 Claims

ABSTRACT OF THE DISCLOSURE

The distortions of an inhomogeneous optical transmission medium are compensated by forming a hologram of an optical wavefront from one communicating station through which the reverse-transmitted message-modulated signal from the other communicating station passes, the reverse transmittal being sent through the hologram from the opposite side corresponding to the conjugate image.

This invention relates to the controlled transmission of signals through inhomogeneous media.

Communication employing coherent waves in the optical portion of the spectrum has been a subject of increasing investigation. At optical wavelengths, transmission through the atmosphere, through water, and possibly through interplanetary space presents difficulties because of scattering losses, refractive distortion losses, diffraction and echoes.

The basic cause of most of these problems is that these transmission media are inhomogeneous media. That is, even when substantially static time-wise, their properties vary from point-to-point along the beam propagation path and from point-to-point across the effective cross-section of the beam. Our present knowledge of the atmosphere and other transmission media does not give us detailed understanding of these variations.

Therefore, I have studied the problem generally, with as little restriction upon the nature of the optical inhomogeneities as possible. Viewed in this way, the atmosphere can be considered as a means for scrambling a communication signal; and the problem becomes the problem of unscrambling the received communication signal. Thus, solution of the problem of transmission through the atmosphere should also yield a powerful technique for private communication, it being necessary merely to employ an inhomogeneous distorting medium of a substantially arbitrary nature in order to prevent unscrambling of the message of unauthorized persons.

An object of my invention is improved communication through an inhomogeneous optical medium.

My invention resides in compensating the distortions of an inhomogeneous optical transmission medium by, first, forming a hologram from a beam transmitted through the medium, the formation being accomplished in any manner that will later provide spatial separation of the true and conjugate images during the subsequent wavefront reconstruction, and, second, transmitting the reconstructing, or precompensated, beam through the hologram from the opposite side in such a manner as to direct a wavefront corresponding to the conjugate image back through the inhomogeneous medium toward the origin of the beam originally transmitted through the medium. A true image is the type of image discussed in classical optical textbooks; and a conjugate image is a special type of image that appears only in the work with holographic techniques. A wavefront capable of producing a conjugate image differs from a wavefront capable of producing a true image in that the former can be described mathematically by exponential-type terms having exponents that are the complex conjugate of the corresponding exponents in the expressions describing the true image. The practical differences between the images will be more fully discussed hereinafter.

In two-way communication, according to a feature of my invention, a signal wavefront from one communicating station acts as a pilot signal that makes a hologram through which the reverse-transmitted message-modulated signal from the other communicating station passes; the hologram essentially encodes the image of the aperture from which the pilot signal came together with the refractive distortions produced by the inhomogeneities of the medium in order subsequently to provide selective paths for the return message-modulated signal. A high proportion of the message-modulated beam will arrive at its destination, i.e., the aperture from which the pilot signal came, and will be compensated for refractive distortion and, in part, for diffraction. In fact, practically all of the portion of the wavefront corresponding to the conjugate image will arrive at its destination, except for some absorption, scattering loss, and some diffraction loss. This method can provide substantially greater efficiency of transmission than any previously proposed method of transmission through an inhomogeneous medium such as the atmosphere, inasmuch as the previously proposed methods suffer very greatly from refractive distortion losses and diffraction losses.

In scrambling or encrypting, according to another feature of my invention, the hologram-producing wavefront encodes both the message and the distorting inhomogeneities of the scrambling medium, and a later applied decoding beam is passed in reverse through the hologram and in tandem in reverse through the same or a duplicate scrambling medium, spaced and positioned indentically as was the original scrambling medium in order to decode the message.

Instrumental in all the embodiments of the invention is a modification of the holographic method. The holographic method illuminates an object or specimen with monochromatic, spatially coherent light, records the waves which emanate from the specimen without the selectivity imposed by an image-forming device, such as an aperture or lens, and then illuminates the record, called the hologram, with monochromatic light. The hologram modulates the light incident upon it in such a manner as to produce replicas of the waves which were initially recorded on the hologram. An image can then be formed from these waves by the human eye or other conventional image-forming equipment.

It should be particularly noted that it is characteristic of the hologram that information concerning each point of the specimen is distributed throughout the hologram. Thus, examination of the hologram under ordinary illumination does not reveal the image that can be produced from it.

The interaction of a coherent light beam with a hologram involves interference phenomena. As explained by Emmett N. Leith et al. in "Microscopy by Wavefront Reconstruction," Journal of the Optical Society of America, 55,981, August 1965, lack of effective separation of the images producible from the various diffraction orders has caused the proposal of a variety of techniques for separating the images. One such technique is proposed in D. Gabor Patent 2,770,166 issued Nov. 13, 1956. Another has been proposed by Leith and Upatnieks and involves the use of a reference beam coherent with the light emanating from the specimen and angularly disposed with respect thereto to avoid the specimen while producing interference fringes in the hologram as a result of interference with light emanating from the specimen. The spacing of the fringes represents the phase relationship of the interfering waves, and the fringe intensity represents the local intensity of the wavefront emanating from the object.

When the developed hologram is illuminated with a monochromatic spatially coherent beam along the direction of the reference beam, the various diffraction orders are now well separated spatially and a clear image can be formed. An easily understandable explanation of this technique has been given by Leith and Upatnieks in their article "Photography by Laser," Scientific American, 212, 24 (June 1965).

Any such technique for separating the diffraction orders can be adapted for employment in practicing my invention, although a modification of the Leith et al. technique is preferred. For example, in the application of my invention to two-way communication systems, the beam used to illuminate the finished hologram is antiparallel to the reference beam, instead of parallel as in the system of Leith and Upatnieks, thus facilitating the employment of a diffraction order that tends to form a conjugate image of the receiving station aperture superimposed upon that aperture and thereby concentrating the power of the signal from the transmitting station at the receiving station to improve the efficiency of transmission.

Likewise, in the scrambling or encrypting application of my invention, the conjugate (real) image is employed instead of the true (virtual) image employed by Leith and Upatnieks.

Although the conjugate (real) image is pseudoscopic, which means that portions of an object appear in front when they should appear in back and vice-versa, this quality of the image has no effect in the various embodiments of my invention because information having at most two spatial dimensions is being transmitted. The absence of the third spatial dimension eliminates the pseudoscopic effect and allows the hologram to function as a true equalizer in a communication system according to my invention or as an accurate unscrambler in conjunction with a scrambling plate in private communication or encrypting according to my invention.

According to another feature of my invention as applied to two-way communication, the iterative formation of holograms at both of two communicating stations is employed to optimize the power transmission between them.

According to still another feature of my invention as applied to two-way communication, the formation of holograms from a pulsed received signal and a pulsed reference beam synchronized with the received signal is employed to eliminate a class of undesirable echoes that can occur when two stations are optically communicating through an inhomogeneous medium. Further, by employing echoes in another way, my invention is applicable to optical probing techniques.

A complete understanding of my invention may be obtained from the following detailed description in conjunction with the accompanying drawing in which.

Figure 1:
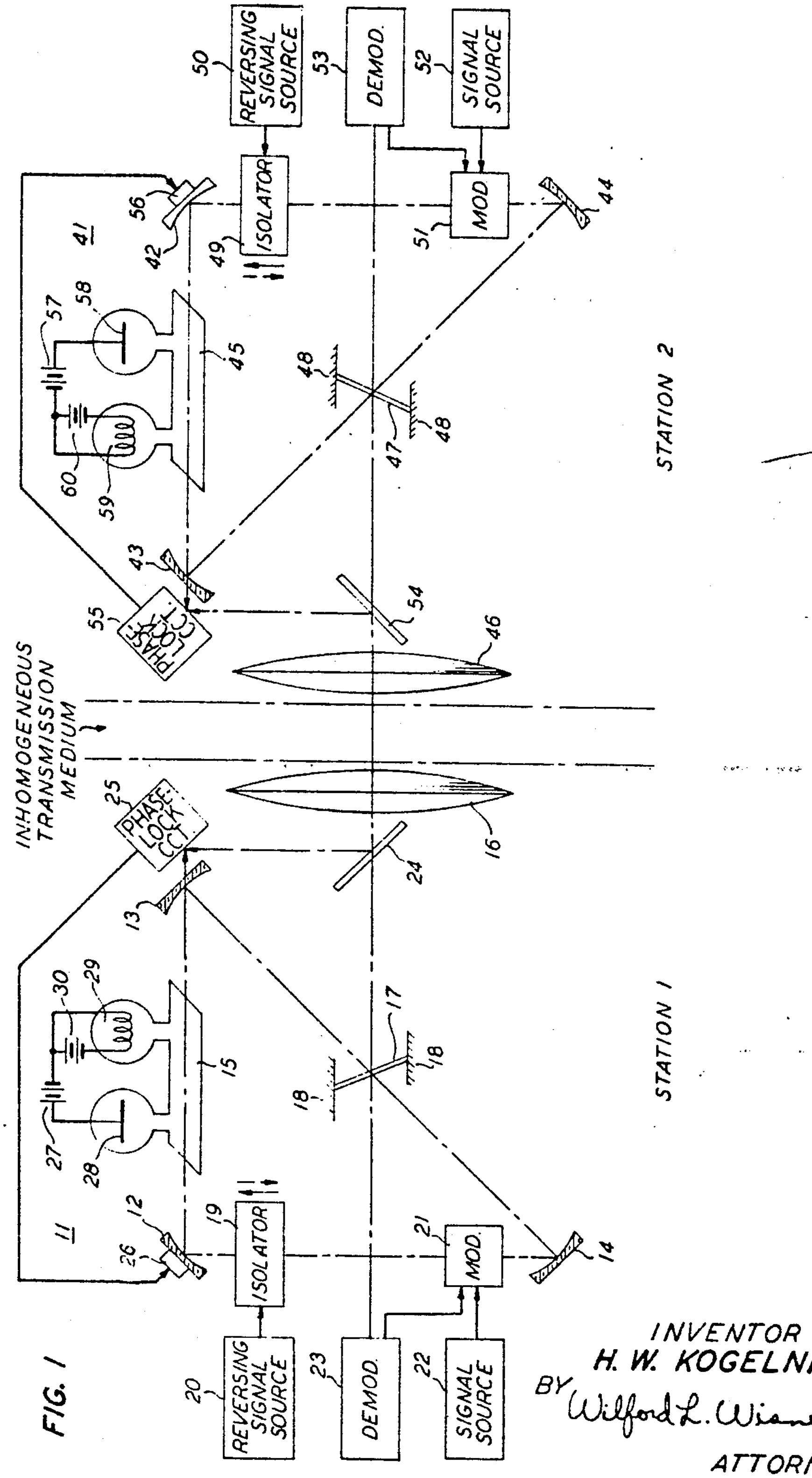
FIG. 1 is a partially pictorial and partially block diagrammatic showing of a preferred embodiment of the invention of improving the efficiency of transmission between two communicating stations.

In FIG. 1, the illustrated embodiment of the invention has the purpose of compensating for some of the power losses that occur in transmission of a signal from station 1 to station 2. Specifically, the refractive distortion losses and diffraction losses can be reduced, so that a larger fraction of the power transmitted by one station actually reaches the receiving aperture of the other station than would be the application of more conventional optical techniques. It can be shown that the efficiency of power transmission can be considered relatively independently of the type of modulation imposed upon the carrier beam. Since that holographic method employed imposes another type of modulation (spatial modulation) upon the beam, a distinction between the two types of modulation should be borne in mind throughout the discussion that follows. Thus, there is the message modulation usual in communication systems; and there is the holographic or spatial modulation, which can be thought of as representing, in combination, an image of the receiving station aperture and the distorting characteristics of the intervening inhomogeneous transmission medium.

In other words, if the person who wishes to transmit a message optically knows the shape of the receiving station aperture, its size in relation to its distance and the nature of all the distortions that are to be produced by the intervening transmission medium, he ought to be able, as I have recognized, to precompensate for these distortions to make a relatively large portion of the transmitted power arrived at the receiving station aperture. At least for the case in which distortions behave in the same way for signals transmitted in both directions, i.e., are reciprocal, my invention provides him with the necessary information in an implicit, but readily utilizable, form and teaches him how to utilize it.

More specifically, in FIG. 1 the communicating station 1 comprises a ring laser 11 including the three oblique mirrors 12, 13 and 14, the laser tube 15, and accessory apparatus to be described hereafter. The communicating station 1 further comprises a lens 16, which acts as the common transmitting and receiving aperture for station 1, a hologram recording medium 17, its mounting brackets 18, which permit meduim 17 to be slidably inserted and removed, and isolator 19 together with a reversing signal source 20 to provide control over the direction of unidirectional oscillation in the ring laser, modulator 21 positioned in the ring resonator and coupled to the modulating signal source 22, which provides the source of message information to be transmitted, and the demodulator 23 positioned to demodulate the received messagebearing radiation. In order to make the ring laser 11 operate coherently with respect to the received radiation in situations in which that is desired, the station 1 still further includes the partially reflective plate glass etalon 24 in the path of the received beam, phase lock circuit 25 to be described hereinafter and a piezoelectric control element 26 energized from phase lock circuit 25 to control the positioning of reflector 12. In order to start the propagation of the reference beam in response to received radiation, demodulator 23 is coupled to modulator 21 in the appropriate sense.

The accessory apparatus of laser 11 includes the direct-current pumping source 27 connected in conventional polarity between an anode 28 and a cathode 29, which is heated by the heater current source 30.

Illustratively, the laser 11 includes ionized argon gas as its active medium and is of the general type disclosed in the copending patent application of E. I. Gordon et al., Ser. No. 385,159, filed July 27, 1964, and assigned to the assignee hereof. Nevertheless, it should be understood that laser 11 could be any other type of laser suitable for use with a ring resonator, or could be a laser with a linear resonator, provided appropriate beam splitting and directing means are employed to supply the steps of the method described hereinafter.

Reflectors 12, 13 and 14 are bicylindrically curved to focus the beam to a round cross section as disclosed in the copending patent application of W. W. Rigrod, Ser. No. 465,135, filed June 18, 1965, and assigned to the assignee hereof, now abandoned. Lens 16 is a large aperture lens of conventional design or a Fresnel lens of the type well known in the art.

The holographic mediums 17 is illustratively a high-resolution photographic emulsion, typically a Kodak 649–F spectroscopic plate or other medium which can be made into a so-called phase hologram of the type disclosed by W. T. Cathey, Jr. in the Journal of the Optical Society of America, vol. 55, p. 457 (April 1965). It should be understood that phase holograms are preferred because of their higher overall transparency, but other types can be used. Alternatively, holographic medium 17 may be an automatically reversible medium of the type disclosed in connection with the embodiments of FIGS. 8 and 11. It should further be noted that during the formation of a hologram at station 2, medium 17 at station 1 is replaced by a ground glass pate which reflects a few percents of the clockwise traveling wave oscillation toward station 2 through the inhomogeneous transmission medium. Medium 17 is adjusted so that the normal to the surface of the medium 17 bisects the angle between the received and reference (clockwise) radiations, at least for the case in which the photographic emulsion is fairly thick.

Isolator 19 is illustratively the well-known type of optical isolator employing a Faraday rotation modulator between polarizers having an angle of 45 degrees between their respective polarization directions. Reversing signal source 20 applies to isolator 19 a signal sufficient to rotate the polarization of a wave by 45 degrees in a sense that depends upon the polarity of the signal from source 20. Alternatively, control over the direction of the unidirectional traveling wave oscillation may be provided by apparatus of the type described in the above-cited copending application of W. W. Rigrod, now abandoned, which apparatus replaces isolator 19 and reversing signal source 20.

Modulator 21 may be a Faraday rotation modulator disposed between aligned polarizers so as to produce amplitude modulation of the traveling wave oscillation in response to the signal from source 22. The source 22 may include apparatus responsive to a voice-type message, as is common in the communication art. Demodulator 23 may be an ordinary photomultiplier responsive to the frequency of radiation being employed by station 2.

Phase lock circuit 25 is illustratively of the type disclosed in the copending application of L. H. Enloe et al., Ser. No. 421,774 filed Dec. 29, 1964 and assigned to the assignee hereof. Specifically, the circuit 25 may include a phase detector and low pass filter of the type disclosed by Enloe et al. The transducer 26 may be a conventional piezoelectric transducer operated in the manner disclosed by Enloe et al.

Separated from station 1 by the inhomogeneous transmission medium is a station 2 containing components virtually identical to the corresponding components of station 1 and numbered by reference numerals 30 digits higher. Nevertheless, station 1 and station 2 in general are operating in different modes during any particular step of the communicating process, as will be more fully described hereinafter.

Before proceeding with a detailed description of operation it is necessary to describe certain theoretical background information of the holographic, or wavefront reconstruction, art. As explained in the above-cited article by Leith et al., the wavefront reconstruction is a process in which the first step produces an intermediate record called a hologram from which the final image is later constructed. It is desirable that the wavefront recorded is of the type that permits the spatial separation of the true and conjugate images during the final reconstruction step. Leith et al. have proposed one method for recording such a wavefront which involves the use of two beams, one reflected from or emanating from the object specimen and the other being a reference beam that is coherent with the beam from the object and displaced to propagate at an acute angle with respect thereto. This technique produces an interference fringe pattern in which the spacing of the fringes varies inversely with the various angles between the reference beam and the various rays emanating from the object specimen. Before conversion of the hologram to a phase hologram, the peak transmission factor of the medium 17 for each of the fringes is proportional to the net intensity of the rays reaching that point in the medium 17. After the conversion of the hologram to a phase hologram, the interference fringe intensity information is stored as differing phase lags for rays passing through various portions of the fringe pattern. Both types of hologram produce the same wavefronts, but the phase hologram does so with less attenuation than the other.

It is a fact that virtually every region in the medium or hologram 17 can contain some information from virtually every point in the object specimen, depending upon the degree to which the coherent radiation has diffused in illuminating the object specimen. The interference pattern produced in the hologram recording surface has been described in the above cited article by Leith et al. as follows: the light emanating from the object specimen and impinging on the recording surface is, from the Fresnel-Kirchoff diffraction formula, $$U(x_2,y_2)=i/(\lambda_1 z_1)\iint s(x_1,y_1)\exp[-ik_1 r_0(x_1,y_1) -ik_1 r_1(x_2-x_1,y_2-y_1)]dx_1 dy_1 \quad (1)$$

where $r_1$ is the distance from the point $x_1,y_1$ on the object to the point $x_2,y_2$ on the recording plate.

The reference beam produccs, at the hologram-recording surface, the spherical wavefront $$U_0=a_0 e^{-k_1 r_2(x_2 y_2)} \quad (2)$$

where $a_0$ is the amplitude of the wave and $r_2$ is the distance from the origin of the wavefront to the point $x_2,y_2$ on the recording plate.

The photographic plate, after exposure and suitable development, has an amplitude transmittance, and, after conversion, a phase lag, which is a function of $|U_0+U|$; for simplicity, assume that the film transmittance becomes $$T=|U_0+U|^2=|U_0|^2+|U|^2+2Re(U_0U^*) \quad (3)$$

When the hologram is illuminated by a divergent beam having the form $e^{-ik_1 r_a}$[where $r_a$ is the distance from the point $(x_2,y_2)$ on the hologram to the center of curvature of the incident wave], several diffracted waves are produced. The zero-order wave is produced by the term $|U_0|^2$ and $|U|^2$, and is of no interest. This order is sometimes called the Gabor order, in honor of its investigator, Dennis Gabor.

The term $2ReU_0U^*=U_0U^*+U_{0*}U$ represents the two first-order images; $U_{0*}U$ represents the true (virtual) image and $U_0U^*$ the conjugate (real) image. Leith et al. have employed the true image; but it is of no interest for the applications herein disclosed because it cannot be made to retraverse the inhomogeneous medium in the proper manner.

It will be noted that Leith et al. refer to the conjugate (real) image as pseudoscopic (page 985 of above cited article in the Journal of the Optical Society of America). That is, for a three-dimensional object specimen, protrusions on the object specimen become intrusions, portions of the specimen in front of others now appear behind and vice-versa. For these reasons, Leith et al. chose to work with the true image and in every case proceed to form the final image by illuminating the hologram from the same side as during the hologram formation.

I have recognized that in situations in which the information recorded has at most two spatial dimensions, the pseudoscopic distortion of the conjugate image does not appear; and I have recognized that employment of such a conjugate image is ideally suited for communication system and other optical transmission system applications. In every case, in order that the reconstructed conjugate image may be projected back along the desired path through the inhomogeneous medium, I illuminate the hologram from the side opposite the side illuminated during the process of formation.

Figure 4:
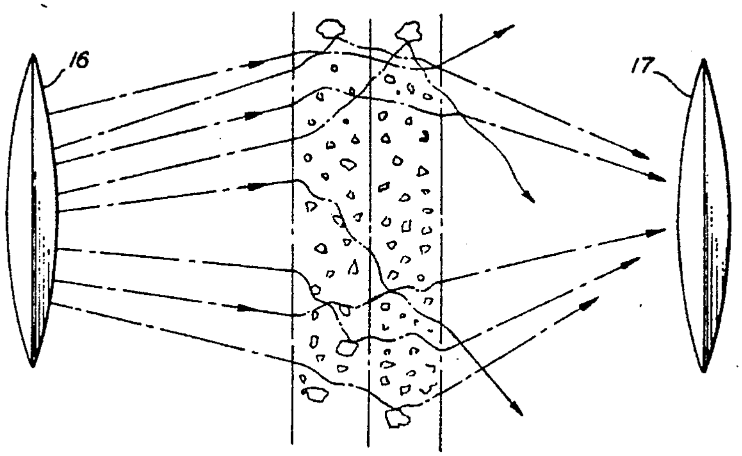
FIG. 4 shows ray paths that are demonstrative of the principles involved in the embodiments of FIGS. 1, 2 and 3.

Consider now the aperture, i.e., lens 16, of the station 1 in FIG. 1 to be the object specimen. Pilot rays emanating therefrom pass through the inhomogeneous medium. Some will eventually pass through the aperture, i.e., lens 46, of station 2; but others will be lost, as shown in FIG. 4.

I desire to make a hologram at station 2 that will enable a large portion of rays transmitted from station 2 to reach station 1. In an isotropic medium, a ray path through the medium can be the same for light traveling from the hologram of station 2 to the object specimen, i.e., aperture of station 1, as for light traveling from the object specimen to the hologram of station 2. If, at the hologram surface, individual rays are sent back along the ray paths traversed from the object specimen, then these rays will be efficiently collected at the aperture of station 1; that is, the object specimen, i.e., aperture, is "reconstructed." This reconstruction is the function that a hologram can provide.

More specifically, in FIG. 1 the first step in my method of communicating is to send a pilot signal from station 1 to station 2 through the inhomogeneous transmission medium. For this step modulator 21 is not energized and isolator 19 is energized by source 20 to pass a unidirectional traveling wave oscillation in the clockwise direction around the ring resonator, as indicated by the solid arrow, and to block any oppositely propagating traveling wave. The holographic medium 17 in station 1 is replaced by a glass plate in order to couple from the resonator a few percent of the traveling wave oscillation by reflection from right-hand surface thereof. The mounting brackets 18 are so disposed that the plate replacing medium 17 directs the reflected radiation through the glass plate 24, which, optionally, can be removed for this step, through the lens 16, through the transmission medium, and through lens 46 of station 2, where a small portion of it is reflected by glass plate 54 to phase lock circuit 55 while the remainder of the radiation reaching station 2 is passed on to the holographic medium 47. It should be noted that during this step many rays of the pilot beam will be lost in the inhomogeneous transmission medium by scattering, diffraction and reflection from certain particles within the medium, as shown in FIG. 4. As the next step in the process, which for all practical purposes is a nearly instantaneous continuation of the first step, the holographic medium 47 is exposed to the interference pattern of the received radiation and a traveling wave oscillation within the ring resonator of laser 41, which is made coherent with the received radiation by the operation of phase lock circuit 55 and piezoelectric transducer 56 and is initiated upon the reception of the received signal by a signal from demodulator 53 to modulator 51. It will readily be understood that premature exposure of medium 47 can be avoided by enclosing station 2 within a shielding enclosure with exception of lens 46 and, if necessary, by placing a high speed electro-optical shutter between the holographic medium 47 and plate 54 to be triggered in response to a portion of the radiation of the desired frequency reflected from plate 54. During the exposure or recording step the medium 47 is the photographic plate of the type above described. The isolator 49 and reversing signal source 50 are adapted to promote the counterclockwise traveling wave within the ring resonator within laser 41; and modulator 51 is switched from a pre-existing nontransmissive state to a transmissive state by the first signal from demodulator 53. Phase lock circuit 55 is in operation during this step. After the exposure of holographic medium 47, it is removed and developed and converted to a phase hologram, as disclosed in the above-cited article by Cathey. The developed medium 47 is replaced in its mountings 48 in precisely the same position as before; and station 2 is now ready for message transmission with improved efficiency.

Nevertheless, it is also desirable to prepare station 1 to transmit messages with improved efficiency; and this can be done in either of two manners. First, a pilot beam may be transmitted from station 2 to station 1 just as a pilot beam was transmitted initially from station 1 to station 2. This will produce a hologram 17 at station 1 of comparable compensating capability as that possessed by hologram 47 at station 2. Alternatively, a hologram 17 of superior capability with respect to reducing diffraction losses can be found by projecting the unmodulated pilot beam through the developed medium 47 so that the conjugate image diffraction order is transmitted to station 1. The latter alternative is preferred. Specifically, the signal from source 50 is reversed so that the isolator 49 passes the clockwise traveling wave, as indicated by the dotted arrow; and modulator 51 is not energized. As the clockwise traveling wave passes through the developed phase hologram 47, the zeroth diffraction order will pass straight on through to reflector 43 (this energy sustains the operation of the laser); but the first diffraction order, corresponding to a conjugate image of the transmitting aperture of station 1, is directed from hologram 47 through the glass plate 54, lens 46 and the inhomogeneous transmission medium toward station 1. The interference pattern in the hologram 47 effectively directs the rays along selected paths in the transmission medium which will eventually bring a large proportion of the rays to be collected by lens 16 of station 1. It should be noted that the ray paths which would result in refractive distortion losses due to inhomogeneities in the medium are precluded by the interference pattern in hologram 47. The pilot beam arriving at station 1 now exposes the holographic recording medium 17 in the same manner as described hereinbefore for the exposure of medium 47. Reversing signal source 20 and isolator 19 are adapted to pass the clockwise traveling wave oscillation within the ring resonator of laser 11 as indicated by the solid arrow. Modulator 21 is not energized; and phase lock circuit 25 is energized to make the traveling wave oscillation coherent with the received radiation. The traveling wave oscillation provides the reference beam and the received radiation is the object specimen beam for hologram formation as described by Leith et al.

It should be noted that in the exposure steps at both station 1 and station 2, the object specimen is effectively the aperture of the other station, as affected by the combined effects of distortions introduced by the inhomogeneities of the transmission meeting.

The holographic medium 17 is removed, developed, converted to a phase hologram and reinserted in the same position, all as described above for hologram 47 of station 2.

Station 1 is now ready for message transmission with improved efficiency. This step may be described as follows:

The signal supplied by source 20 to isolator 19 is reversed so that the counterclockwise traveling wave is now permitted to oscillate, as indicated by the dotted arrow. Phase lock circuit 25 is inoperative and signal source 22 supplies a message-responsive signal to modulator 21. As the modulated wave passes through the developed phase hologram 17, a few percent thereof is diffracted to pass through plate 24 and lens 16 toward station 2. This diffracted radiation is the diffraction order corresponding to a conjugate image of the aperture of station 2, as affected by the distortions of the inhomogeneities in the transmission medium, and is hereinafter called a conjugate image diffraction order. A large proportion of these transmitted rays arrive at the aperture of station 2 because they do not travel in paths that would result in refractive distortion losses and because the wavefront and the field amplitude distribution across it are shaped to reduce diffraction losses. Thus, the efficiency of message transmission from station 1 to station 2 has been improved.

Similarly, a message may be transmitted from station 2 to station 1 via the conjugate image diffraction order with improved efficiency but with somewhat greater diffraction loss, because the record in medium 47 was made without the benefit of any record in medium 17.

The method of communication just described may be extended by an indefinite number of steps of iteration of hologram formation to reduce diffraction losses even further, as may be described with reference to FIG. 2. It will be noted in FIG. 2 that the steps through the second recording of an interference pattern are substantially identical to those described above in connection with the embodiment of FIG. 1. At this point, however, the iterative method substitutes for the step of message transmission the transmission of another pilot beam through the hologram 17 of station 1 and through the inhomogeneous medium to station 2 to form a new hologram at station 2, a new undeveloped medium 47 having been inserted in the mountings 48 at station 2. It should be noted that in this step the pilot beam is transmitted through the last previously developed hologram 17 at station 1 and is utilized to expose the new holographic medium at the station 2 in the manner above described. Similarly, a pilot beam may be transmitted from station 2 through the last previously developed holographic medium 47 at station 2 to expose a new holographic medium 17 at station 1. In each case, the newly exposed medium is removed, developed, and converted to a phase hologram and reinserted as above described. Such iterative formation of developed holograms may be continued an indefinite number of times until either further improvement is insignificant or it is determined that diffraction losses have been reduced to the level desired for message transmission. Diffraction losess are primarily due to the transmitting aperture, together with some modifying effect of the inhomogeneous medium. Basically, diffraction losses are reduced by the just-described iteration by shaping the field amplitude distribution in a cross-section of the transmitting beam in a fashion to compensate for diffraction. The iterative formation of holograms provides increasing accurate information, in implicit form, about the diffraction characteristics of the transmitting aperture.

Figure 2:
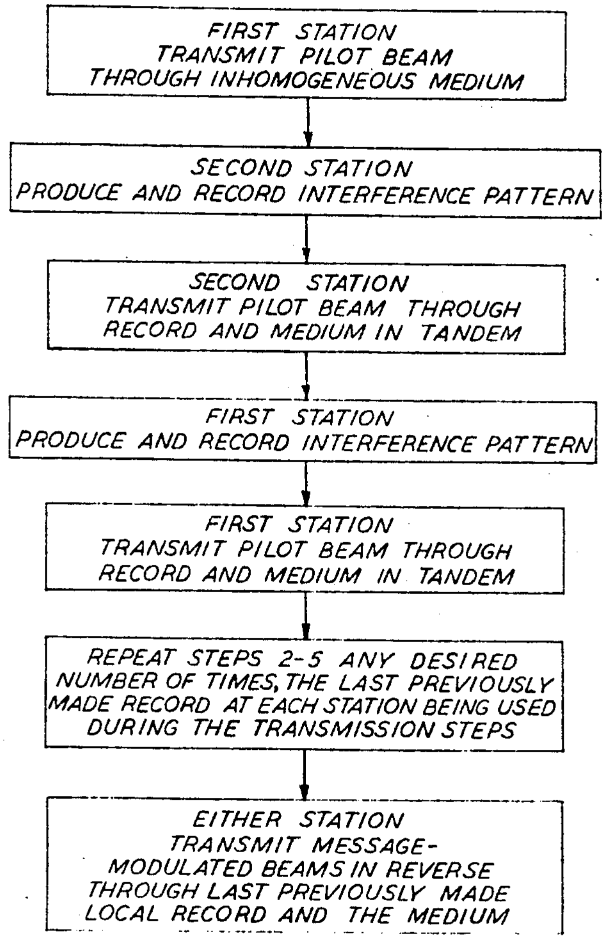
FIG. 2 is a block diagram of the method employed in operating the system of FIG. 1 iteratively, according to a feature of the invention.

Although the embodiment of FIG. 1 and its modifications disclosed in FIG. 2 provide efficient transmission between station 1 and station 2, some of the successfully transmitted radiation may be objectionable in that it includes rays reflected from particles or bodies suspended in the inhomogeneous transmission medium and providing a sufficiently longer transmission path between stations 1 and 2 so that an objectionable echo results. Some such echo paths are illustrated in FIG. 4, which shows hypothetical ray paths between lens 16 and lens 17. Such objectionable echoes can be eliminated by the modification of the embodiment of FIG. 1 as illustrated in FIG. 3, involving corresponding modifications of the steps of the methods described above in reference to FIGS. 1 and 2.

Figure 3:
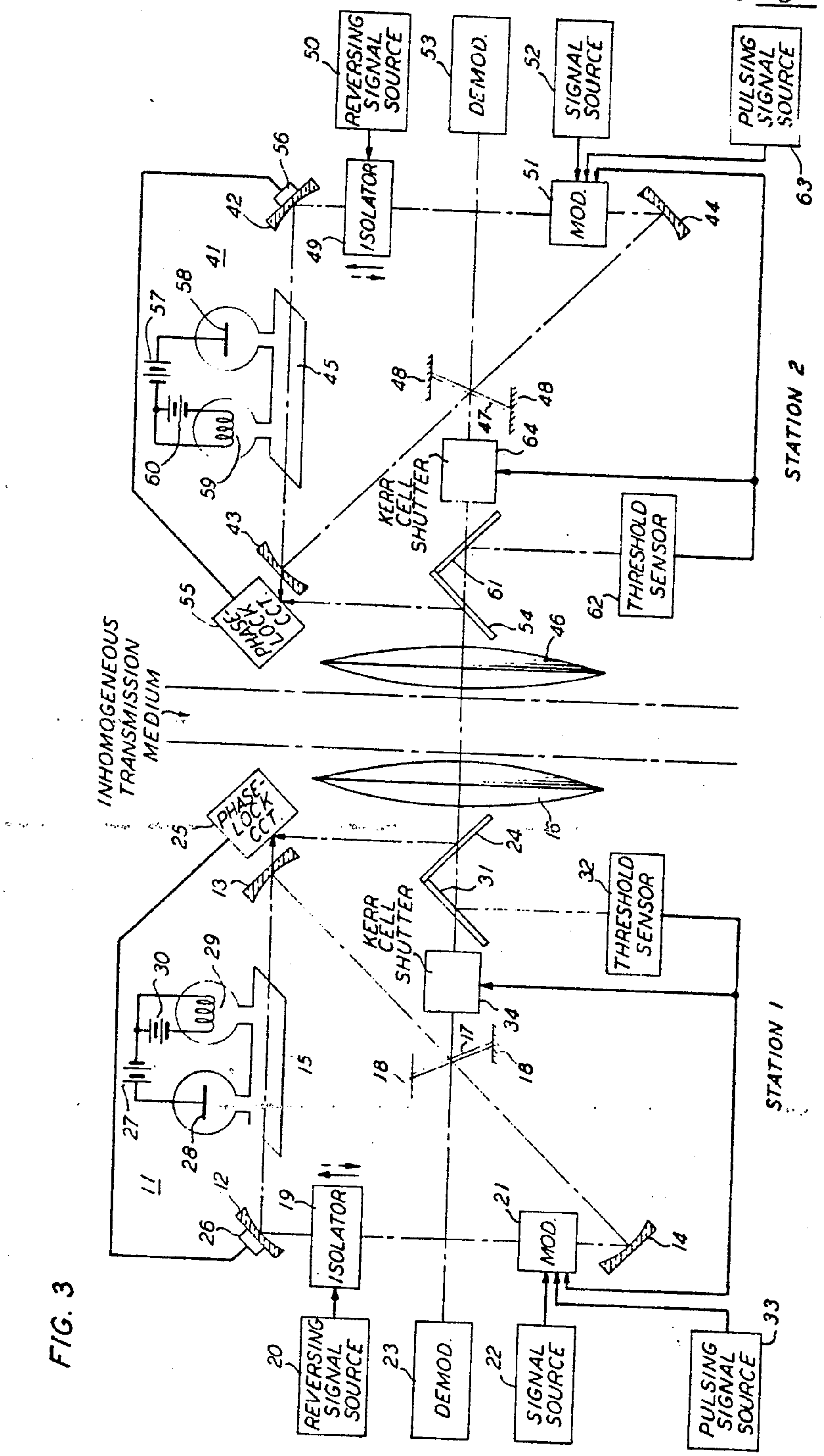
FIG. 3 is a partially pictorial and partially block diagrammatic showing of another embodiment of the invention for reducing echoes in optical signal transmission between two communicating stations.

Basically, in the modified embodiment of FIG. 3, the pilot beams are pulsed by sources 33 and 63, and the main component of the received radiation is discriminated from the echo component by means of threshold sensors 32 and 62 that control the pulsing of the reference beam for exposure of the hologram medium. Components in the embodiment of FIG. 3 corresponding to components in FIG. 1 are numbered with the same reference numerals and are preferably identical to the corresponding component of FIG. 1 except where otherwise specified hereinafter. In particular a second glass plate 31 in station 1 and a like glass plate 61 in station 2 are provided to direct components of the received radiations to threshold sensors 32 and 62, respectively; and the threshold sensors respectively apply pulses to the modulators 21 and 51 to initiate the reference beam when needed for hologram exposure. That is, during reception of the respective main components of the pilot beams, modulators 21 and 51 respectively, are switched from nontransmissive conditions to transmissive conditions by sensors 32 and 62. The Kerr cell shutters 34 and 64, of conventional type, are inserted before the holographic media 17 and 47 and are rendered transmissive by threshold sensors 32 and 62, respectively, only in response to the main components of the received radiation. Thus, the received echo rays, i.e., as illustrated in FIG. 4, are not effective to participate in the exposure of the holographic media 17 and 47 and the next beam transmitted through each of these records produces a conjugate image diffraction order which propagates no rays in the echo paths against which sensors 32 and 62 have discriminated. Thus, the received component of the newly transmitted beam includes essentially no corresponding echo component.

Figure 5:
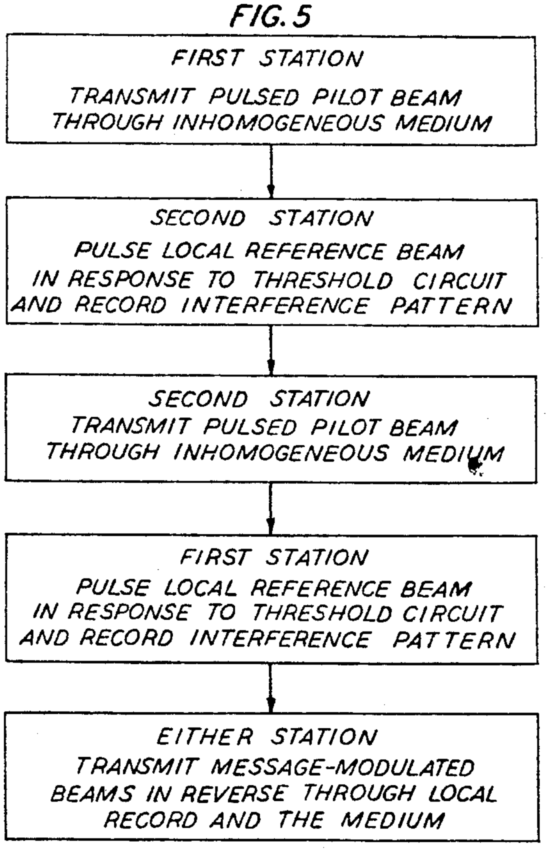
FIG. 5 is a block diagram of the method employed in operating the system of FIG. 3.

It should be noted that the holograms for actual message transmission may be prepared by an iterative process similar to that described in FIG. 2. Once a suitable degree of echo elimination and low diffraction loss is achieved, message transmission through the holographic medium of the transmitting station may be accomplished on a continuous-wave, rather than a pulsed, basis without echoes. The method involved in the operation of the modified embodiment of FIG. 3 is outlined for the sake of clarity in the block diagram of FIG. 5.

Figures 6A, 6B:
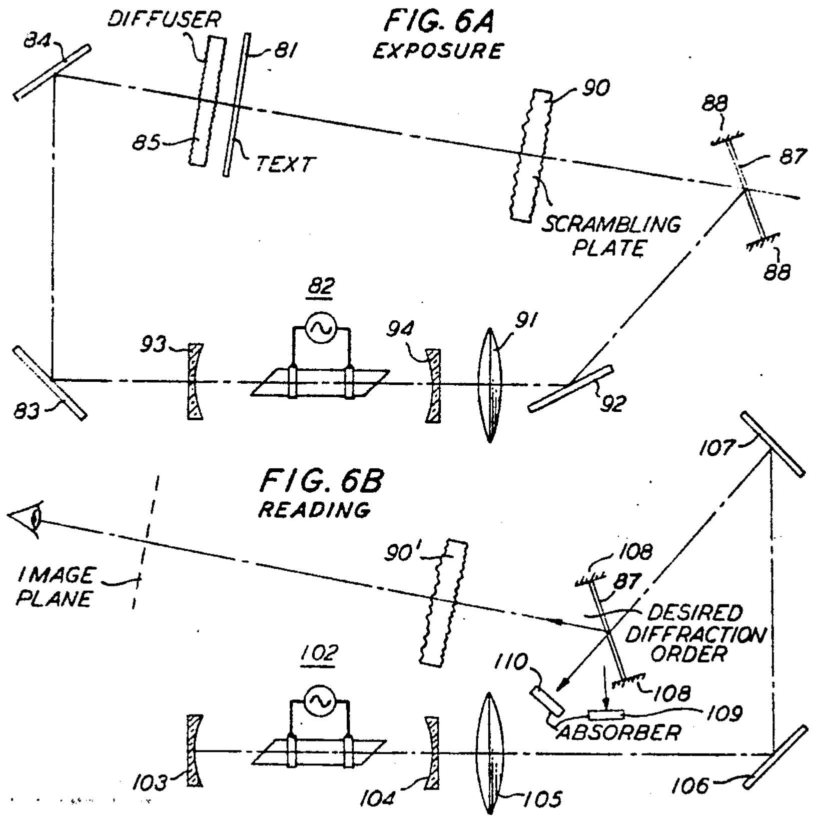
FIGS. 6A and 6B are pictorial illustrations of apparatus for practicing the method of scrambling and unscrambling a message for private communication according to the invention.

The embodiments described heretofore are broadly applicable to communication between two stations, regardless of the nature of the information of messages transmitted. In certain circumstances, however, it is desirable to be able to perform special types of communication, such as private communication. Private communication is communication which renders the transmitted message unintelligible to one who intercepts it unless he is able to unscramble it. FIGS. 6A and 6B demonstrate an embodiment of the invention in which a message originally formulated in the manner of a printed page, or as a drawing or as a two-dimensional display of some sort, is scrambled and recorded on a hologram in such a way that it can be unscrambled only by one possessing the hologram and the same or a duplicate scrambling element. More specifically, in FIG. 6A, the text to be communicated privately is displayed upon a developed photographic transparency 81. The transparency 81 is illuminated by coherent light from the laser 82 via the obliquely reflecting elements 83 and 84 and the diffuser plate 85. The function of diffuser plate 85 is to diffuse the coherent radiation from laser 82 so that it not only illuminates transparency 81, but also so that rays from nearly every portion of transparency 81 will participate in forming the diffraction pattern at nearly every portion in the holographic medium 87. The diffuser plate 85 may be a lenticular screen of the type disclosed in R. A. Bull et al. Patent No. 1,970,358, issued Aug. 14, 1934. The holographic medium 87 is supported in mounting brackets 88 similar to those described in the previous embodiments. The transparency 81 is placed so that it is readable when viewed from the side toward diffuser 85 looking toward scrambling element 90. The inhomogeneous transmission medium in this embodiment of the invention is the scrambling element 90, which illustratively is a sheet of glass or transparent plastic having repeated bumps and hollows in the surface thereof and providing a fairly uniform thickness between the surfaces throughout the plate. To participate in forming an interference fringe pattern during the exposure step, laser 82 also provides a reference beam via lens 91 and reflector 92, which is disposed to direct the reference beam to propagate at an acute angle with respect to the radiation passing through scrambling element 90. For convenience in providing a separation between the beam illuminating transparency 81 and the reference beam, these beams may be extracted from laser 82 through the partially transmissive end reflector 93 and the opposed partially transmissive reflector 94, respectively. The radiation emanating from the transparency 81 through scrambling element 90 is thus coherent with, or phase related to the radiation of the reference beam as reflected from reflector 92. Preferably the total light path from one of the reflectors, e.g., 93 to hologram 87 should be the same for both the reference beam and the signal. After exposure, the holographic medium 87 is removed and developed and may be transported from place to place or transmitted by scanning techniques on the conventional telephone networks or radio circuits. In order to retrieve the message, i.e., the text originally displayed on transparency 81, it is necessary to "read out" the message in the manner illustrated in FIG. 6B. A laser 102 directs a beam of monochromatic radiation through the partly transmissive end reflector 104 and the lens 105. The beam is reflected from reflectors 106 and 107 to illuminate the developed hologram 87 in a direction antiparallel to the direction from which the reference beam struck the holographic medium during the exposure step. It should be clear that in this embodiment, as in the preceding embodiments, the employment of the developed hologram involves illuminating it from the side opposite to that illuminated during the exposure step. The zero-th diffraction order and the diffraction order corresponding to the true image are absorbed by absorbers 110 and 109 respectively; and the diffraction order corresponding to the conjugate image is intercepted by a duplicate 90' of the scrambling element 90, duplicate scrambling element 90' being disposed with respect to the hologram 87 in a manner identical to the disposition of scrambling element 90 during the exposure step. Upon passage through duplicate scrambling element 90', the reconstructed wavefront is distorted in such a way as to compensate for the original scrambling distortion introduced by scrambling element 90, so that a conjugate (real) image is formed beyond duplicate coating plate 90' in the position indicated as the image plane. The conjugate image thus formed may be viewed by a human observer as indicated in FIG. 6B. If the human eye is moved farther from the duplicate scrambling element 90' than the indicated image plane, the image may still be observed because of the capability of the human eye to form an image from the diverging wavefront beyond the image plane. Alternatively, a ground glass plate or other projection screen may be placed at the image plane. The reconstructed image may be viewed by reflection if the original transparency 81 was turned to be viewed looking toward diffuser 85. The reconstructed message or drawing is not pseudoscopic, since the message displayed originally on transparency 81 had only two spatial dimensions.

I have successfully achieved scrambling and unscrambling of printed messages originally recorded on transparencies by employment of the embodiment and techniques just described and I have found that the intermediate record represented by the hologram 87 is indeed rendered highly unintelligible with coherent of incoherent illumination, even to one experienced in the optical art, by fairly moderate distortion introduced by scrambling element 90. Illustratively, the irregularities i.e., bumps and hollows in coating plate 90 may each range in size from $\frac{1}{10}$ to $\frac{1}{1000}$ of the total area of the scrambling element 90. In other words, the inhomogeneities in scrambling element 90 are several orders of magnitude larger in area than the inhomogeneities present in the diffuser plate 85.

Figure 7:
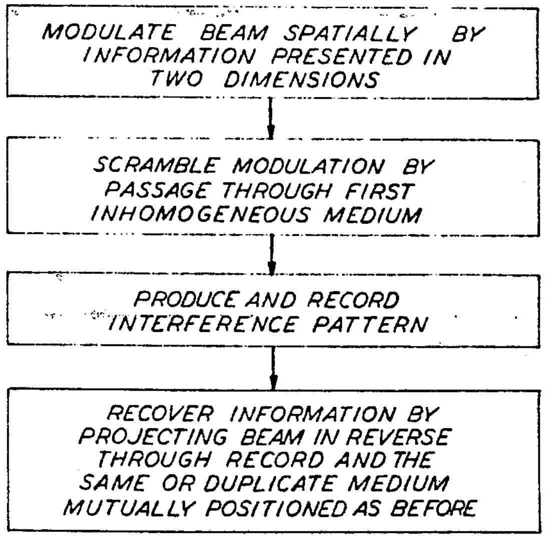
FIG. 7 is a block diagram of the method employed in operating the apparatus of FIGS. 6A and 6B.

To understand the difference in the functions of diffuser plate 85 and scrambling element 90 one must observe that the function of each is intimately related to its positioning with respect to the transparency 81 and the holographic medium 87. Specifically, the scrambling element 90 appears between the transparency 81 and the holographic medium 87 during the exposure process. The method involved in the operation of the embodiment of the invention illustrated in FIGS. 6A and 6B is outlined in block diagram form in FIG. 7.

Moving still further into the peripheral areas of the communication art, I have recognized that my invention is also applicable in optical probing techniques where the probing must be accomplished through an inhomogeneous medium introducing substantial distortions. Specifically, in FIG. 8 an optical method of probing in the fashion of the radar is disclosed. The apparatus comprises a lens 116 serving as the transmitting and receiving aperture, a ring laser 111 which includes the ring resonator formed by reflectors 112, 113 and 114 and which is substantially identical to laser 11 of FIG. 1, the isolator 119, reversing source 120, Kerr cell shutter 121, the radar pulsing signal source 122, the phase lock circuit 125, the piezoelectric transducer 126 and the partially reflective plate 124, all coupled together as shown and as explained hereinafter. Further, the optical probing apparatus comprises a holographic medium 117 that is automatically and reversibly changeable in response to incident radiation of appropriate levels, as described hereinafter. The medium 117 is mounted in brackets 118.

Figure 9:
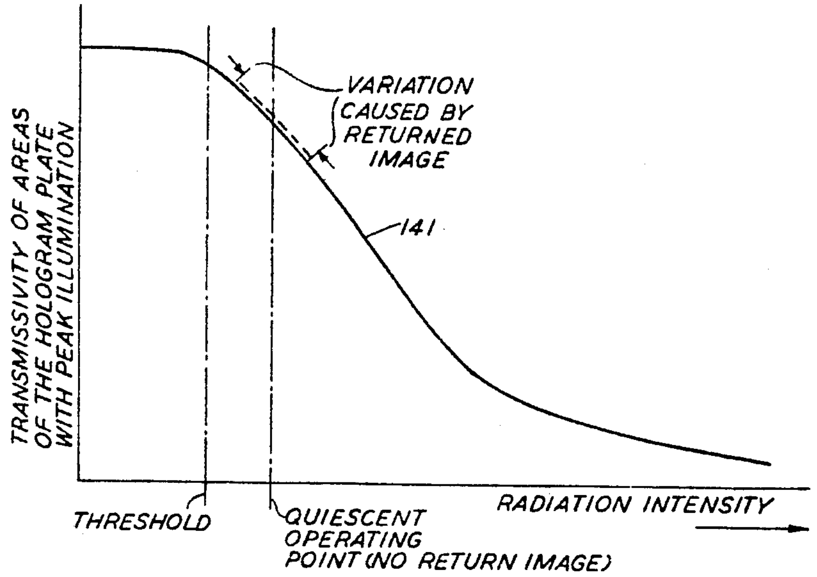
FIG. 9 shows a curve that is helpful to the understanding of the automatically reversible operation of a hologram as employed in the embodiment of FIG. 8, and as employable in the other embodiments of the inventions.

Phase lock circuit 125 is substantially similar to phase lock circuit 25 of FIG 1; and it controls the piezolectric element 126 to make the reference beam propagating within the ring laser coherent with the reflected radiation received from the object 131. The holographic medium 117 for this embodiment of the invention is illustratively a reversible dye having a fairly low threshold of radiation intensity for changing the patterns stored therein. For example, the reversible dye of the holographic medium 117 may be dye type 43–540 made on a celluloid sheet and sold by American Cyanamid, Inc. Moreover, to provide the changeability of the record stored in medium 117 at the times desired, the dye is biased by the continuing presence of either the reference beam or a transmitting beam. Reference is now made in FIG. 9, in which the curve 141 shows the response of the dye to incident radiation. It will be seen that a certain threshold intensity is required before any change in the transmissivity of the holographic medium appears. The reference beam is selected to have an intensity lying above this threshold for establishing a quiescent operating point as indicated when no reflected radiation is received. Thus, the reference beam in combination with the reflected radiation received is effective to change the condition of some areas of the holographic medium 117 to be more transmissive while other areas become less transmissive. The reference beam is made coherent with the currently received reflected pulse by phase-lock circuit 125. An interference fringe pattern is thus produced that is analogous to the patterns formed on the photographic media employed as the holographic media in the preceding embodiments of the invention.

The reference beam is terminated when no signal pulse is being received; and reversing signal source 120 reverses the transmission direction of isolator 119. The subsequently transmitted beam is a pulse beam substantially of the same color as used in forming the interference fringe pattern. There is no pulse being received now. As the subsequently transmitted pulse is being guided toward object 131 by the interference fringe pattern, it is washing out the pattern.

The entire cycle is now repeated. The method for operating the embodiment of FIG. 8 can now be specified in more detail as follows:

Initially, isolator 119 and reversing signal source 120 are adapted to promote the propagation of a traveling wave oscillation in the clockwise direction, as indicated by the solid arrow. When this traveling wave is incident upon the holographic medium 117 a small fraction thereof, for example, 2 or 3 percent, is reflected from the surface of the Celluloid sheet that supports the dye and is directed through the glass plate 124, lens 116 and the inhomogeneous transmission media toward whatever reflecting object 131 happens to lie in the path of that transmitted beam. A portion of the radiation will be reflected back through the inhomogeneous media and will be collected by the lens 116 and projected upon the photographic media 117. A portion of the reflected radiation so received will be directed by plate glass 124 to phase lock circuit 125 so that, when the reference beam is generated, it will be coherent with the received radiation; and detector 128 controls reversing signal source 120 so that the reference beam will be a clockwise traveling wave oscillation. The reference beam is generated by opening shutter 121 with a pulse from source 122 in response to the received radiation as detected by detector 128. The two radiation beams now interfere to produce an interference fringe pattern in the plane of medium 117. The received radiation reflected from object 131 is effective to change the state of the photochromatic dye sufficiently to make the interference phenomenon readily apparent as an interference fringe pattern. The apparatus is now ready for retransmission of a probing pulse that will yield more reflected radiation from the object 131. Upon the disappearance of the received pulse, the signal supplied by source 120 to isolator 119 is reversed so that the traveling wave oscillation in the ring resonator will be permitted to propagate in a counterclockwise direction when the Kerr cell shutter 121 is again opened by the next subsequent pulse from the pulsing signal source 122, which is free-running in the absence of a triggering signal from detector 128. A portion of the counterclockwise oscillation passing through the holographic medium 117 is diffracted by the interference fringe pattern through the plate 124, the lens 116 and the inhomogeneous medium toward object 131. In this step, the interference fringe pattern imposes restrictions upon the transmitted radiation, which is permitted to follow ray paths to the object 131 such that an increased portion of the radiation reflected back through the inhomogeneous medium can be collected by lens 116. The newly received rays are permitted to pass through plate 124; and the majority pass through 117 to the detector 128, which now provides an increased amplitude of output signal making possible a measurement of properties (like speed or distance) of the reflecting object 131. The interference fringe pattern in holographic medium 117 is simultaneously reformed by reversing the transmission direction of isolator 119 to the clockwise direction. The holographic medium 117 is now ready for diffracting the conjugate image diffraction order for the next counterclockwise traveling-wave pulse toward the object 131.

Figure 8:
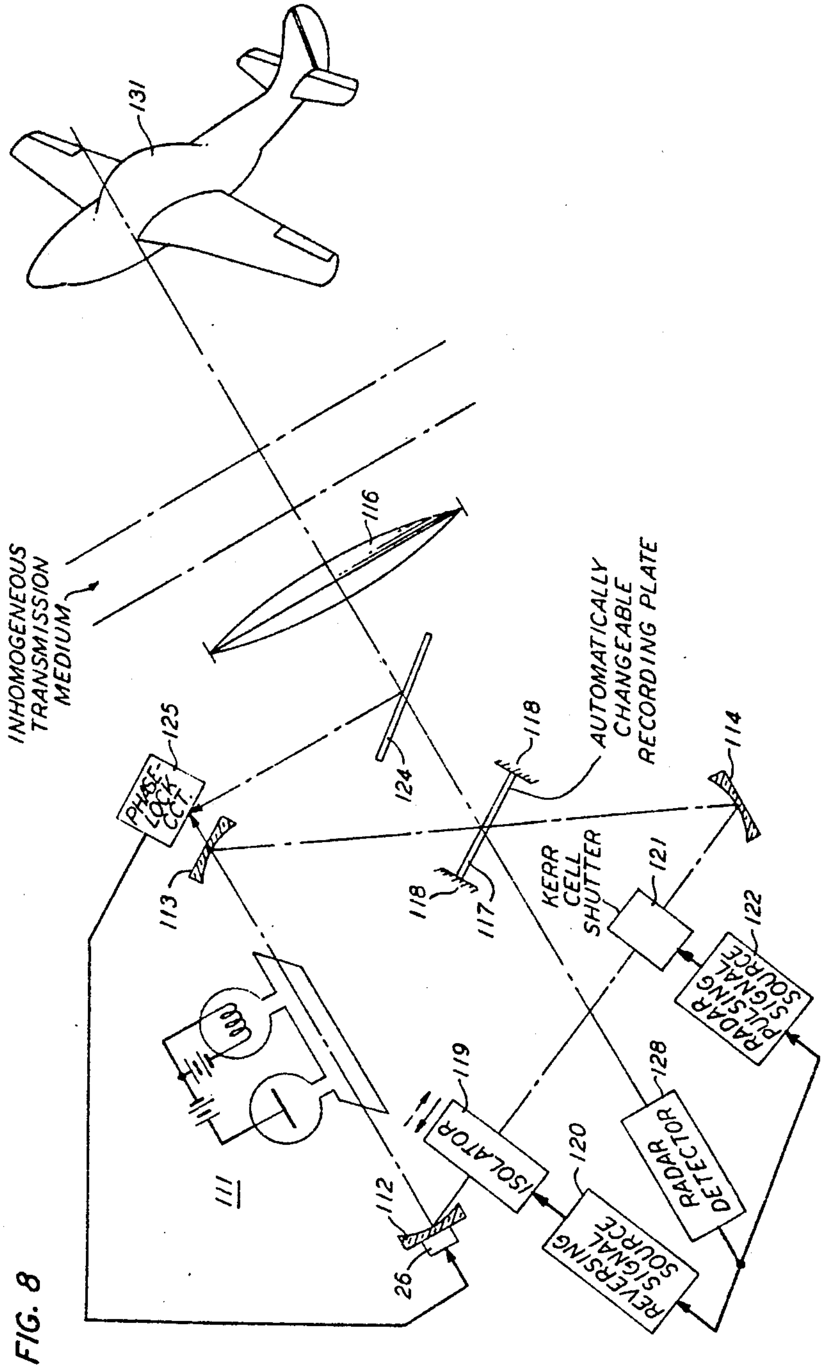
FIG. 8 is a partially pictorial and partially block diagrammatic showing of an optical probing apparatus according to the present invention.
Figure 10:
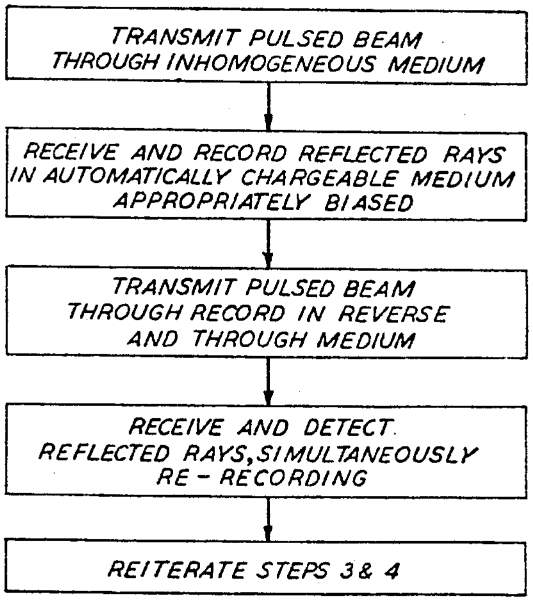
FIG. 10 is a block diagram of the method employed in operating the apparatus of FIG. 8.

The method involved in the operation in the embodiment of FIG. 8 is outlined in block diagram form in FIG. 10.

Continuously reversible formation of the hologram together with continuous message transmission may be provided in a modification of the embodiment of FIG. 1 to achieve completely automatic operation. Such a system is illustrated in FIG. 11.

Figure 11:
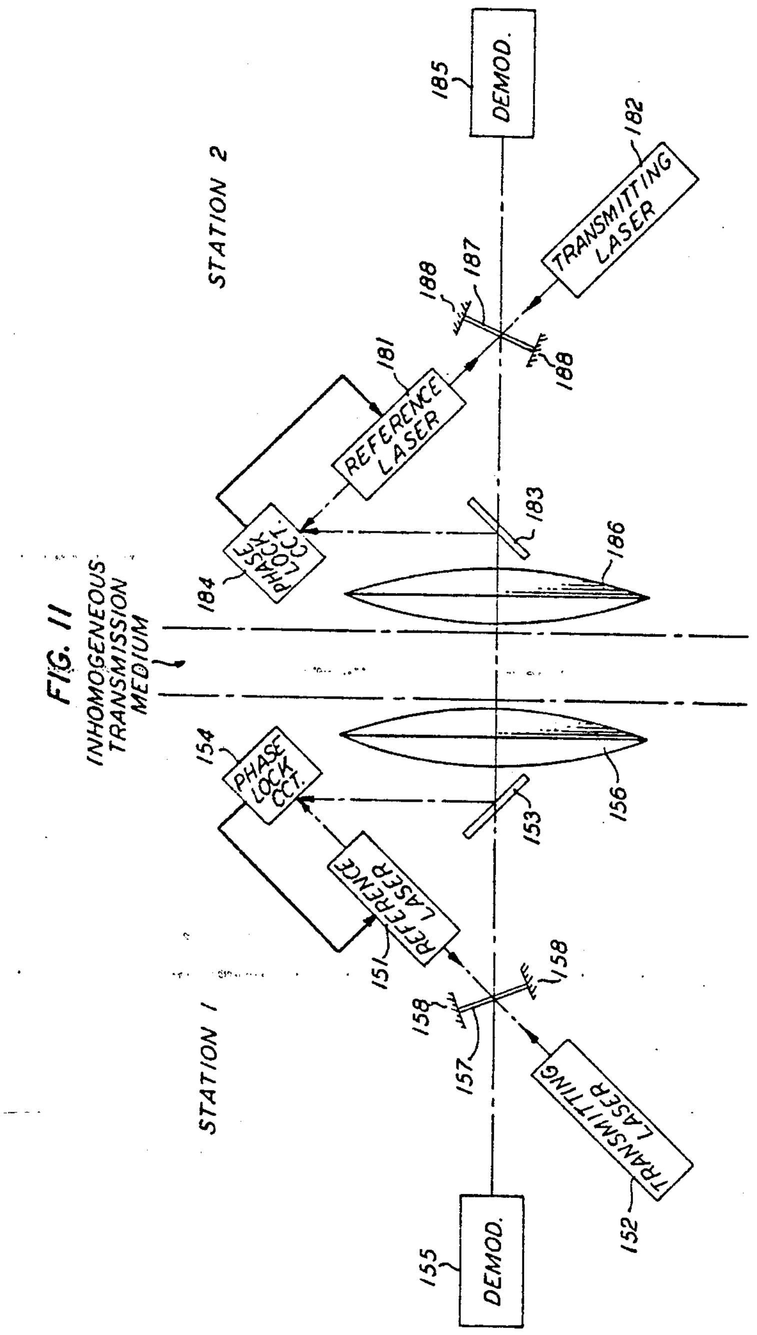
FIG. 11 depicts a modification of the embodiment of FIG. 1 showing continuous, completely automatic reversible operation.

In FIG. 11, station 1 and station 2 are separated by the inhomogeneous medium and are similarly constructed. For example, station 1 includes the lens 156, which gathers incoming radiation, followed by the partially reflective glass plate 153, the automatically reversible dye 157, and the demodulator 155. Phase lock circuit 154 responds to a portion of the received radiation and to a portion of the output radiation from reference laser 151 and is coupled to reference laser 151 to render those radiations coherent. The remainder of the output radiation from reference laser 151 is directed upon the dye 157 such that the normal to the dye surface bisects the angle between the received radiation and the reference laser radiation. The output radiation of transmitting laser 152 is directed upon the opposite surface of the dye 157, antiparallel to the direction of the reference radiation. It is important to note that lasers 151 and 152 are noncoherent; that is, they are not phase-locked one to another.

In a fashion analogous to that disclosed for FIG. 1, the initial pilot beams are provided by reference laser 151 in station 1 and reference laser 182 in station 2 via reflection from the surfaces of dyes 157 and 187, respectively. Alternatively, another laser source can be used in each station to provide a pilot beam.

The automatically reversible dyes 157 and 187 are like dye 117 in FIG. 8. Phase lock circuits 154 and 184 and demodulators 155 and 185 are like their counterparts in FIG. 1. Lasers 151, 152, 181, and 182 are illustratively argon ion lasers of the type disclosed in the copending application of E. I. Gordon et al., Ser. No. 466,014 filed June 22, 1965, and assigned to the assignee hereof.

The important aspect in which the automatic operation of this embodiment differs from the operation of the embodiment of FIG. 8, with respect to the reversible dye, resides in the fact that, in station 1, for example, lasers 151 and 152 can operate continuously and simultaneously but noncoherently with respect to one another. Thus, the beam from laser 152 continuously tends to "wash out" the interference fringe pattern as it is being continuously reformed by the received radiation and the reference beam from laser 151. Simultaneously, the interference fringe pattern is directing the conjugate image diffraction order of the transmitting beam back along the path of the received radiation toward the aperture of station 2 i.e., its lens 186. The "washing out" effect is taken into account by making the radiation from transmitting laser 152 part of the quiescent operating point bias, as designated in FIG. 9. That is, the quiescent operating point bias is the sum of the intensities of the local reference laser and the local transmitting laser at the dye surface. Nevertheless, the local transmitting laser does not participate in forming the interference fringe pattern because it is noncoherent with the radiations forming the interference fringe pattern.

Continuous message transmission in both directions is possible, even while the "equalization" effect of the patterns in the dye are continuously being adapted to changing conditions in the transmission medium.

In all the preceding embodiments of the invention, two beams were employed to provide a well-defined interference fringe pattern. This technique is preferred for providing spatial separation between the conjugate and true images that can be formed from the different diffraction orders. Nevertheless, it should be understood that other techniques exist for separating the two images; and, although these techniques are currently thought to be inferior to the two-beam technique, it is clearly apparent that they could be adapted to a level of proficiency adequate for use in the present invention. The scope of the present invention is considered to encompass any other method by providing adequate discrimination between the true and conjugate images, the conjugate image being utilized for transmission of radiation according to my invention. It should also be apparent that other lasers, optical devices and other holographic media may be employed. Other automatically changeable holographic media of the type having low thresholds are currently under investigation and are clearly applicable to all the embodiments of the present invention, not just to the embodiments of FIG. 8 and FIG. 11. Moreover, if the hologram or recording medium is made to operate by reflection, for example, by silvering the front surface thereof, then the retransmitting or reconstructing radiation is directed upon the hologram so that its mirror-image beam would be antiparallel to the reference radiation.

Further, it is clear that the invention can be practiced in cases in which the inhomogeneous medium produces absorption loss, provided sufficient intensity of radiation can be received to form the hologram.

In all cases, the above described arrangements and methods are illustrative of a small number of the many possible specific embodiments that can represent applications of the principles of the invention. Numerous and varied other arrangements and methods can readily be devised in accordance with these principles by those skilled in the art without departing from the spirit and scope of the invention.

What is claimed is:

1. A method of transmitting radiation through a transmission medium comprising the steps of transmitting from an object specimen to a recording surface a beam of coherent radiation through said medium, recording at said recording surface a wavefront produced from said beam to represent the object specimen and the transmission characteristics of said medium, and transmitting another beam of coherent radiation to strike the recording surface in a direction that directs a wavefront corresponding to a conjugate image of said original surface through said medium to compensate for said transmission characteristics.

2. A method according to claim 1 in which the first transmitting step comprises transmitting the beam as a pilot beam from a first communicating station including an aperture as the object specimen to a second communicating station including the recording surface, and the second transmitting step comprises transmitting a message-modulated beam of radiation to strike the recording surface in a direction that directs a wavefront corresponding to a conjugate image of said aperture through the medium to pass through said aperture.

3. A method according to claim 1 in which a first communicating station includes a first aperture as the aforesaid object specimen and includes a first recording surface and a second communicating station includes a second aperture and a second recording surface as the aforesaid recording surface, and in which the first transmitting step comprises transmitting the beam as a pilot beam from the first station to the second station through the medium, the second transmitting step comprises transmitting a second beam of coherent radiation as a pilot beam to strike the second recording surface in a direction that directs a wavefront corresponding to a conjugate image of said first aperture through said medium to pass through said first aperture, and including the additional steps of recording at said first recording surface a wavefront produced from said second beam to represent said second aperture including some diffraction characteristics thereof and to represent some inhomogeneities of said medium that tend to produce distortion losses, retransmitting the first beam of coherent radiation as a pilot beam to strike the first recording surface to direct a wavefront corresponding to a conjugate image of said second aperture through said medium to pass through said second aperture, rerecording at said second recording surface a wavefront produced from the first beam to represent the first aperture including some diffraction characteristics thereof and to represent some inhomogeneities of said medium that tend to produce distortion losses, and transmitting message-modulated beams between the first and second stations to strike the last-made record at the transmitting station in a direction that directs a conjugate-image diffraction order through the medium to pass through the aperture of the receiving station.

4. A method according to claim 1 in which the first transmitting step comprises transmitting a pulsed beam of coherent radiation from a first communicating station including an aperture as the object specimen to a second communicating station including the recording surface, the recording step includes discriminating a directly transmitted component of the beam from an echo component thereof and recording at the recording surface a wavefront produced from the directly transmitted component but not the echo component, and the second transmitting step comprises transmitting a message-modulated beam of radiation to strike the recording surface in a direction that directs a wavefront corresponding to a conjugate image of said aperture but excluding echo ray paths through the medium to pass through said aperture.

5. A method according to claim 1 in which the first transmitting step includes transmitting the beam from a two-dimensional information display as the object specimen to the recording surface through a first scrambling element as the transmission medium, and the second transmitting step comprises transmitting an unmodulated beam of coherent radiation to strike the recording surface in a direction that directs a wavefront corresponding to a conjugate image of said display through a second scrambling element substantially identical to said first scrambling element and disposed in substantially identical manner with respect to the recording surface, said wavefront upon passing through said second scrambling element forming a reconstructed image of said information display.

6. A method according to claim 1 in which the first transmitting step comprises transmitting the beam as a pulsed beam from an aperture of a probing apparatus through the medium to be reflected from a reflecting object back through the medium and the aperture to the recording surface, the recording step comprises recording at said recording surface a wavefront produced by said reflected radiation to represent said aperture, said reflecting object and some of the distortions produced by said medium, and the second transmitting step comprises transmitting a pulsed beam of coherent radiation to strike the recording surface in a direction that directs a wavefront corresponding to a conjugate image of said aperture and said object through said aperture and said medium toward said object to be reflected therefrom and returned through said medium and said aperture.

7. A method of transmitting radiation through an inhomogeneous medium comprising the steps of transmitting from an object specimen to a recording surface a beam of coherent radiation through said medium, recording at said recording surface an interference fringe pattern produced by said transmitted beam and a local reference beam coherent with said transmitted beam and propagated at an acute angle with respect thereto to represent said object specimen and some distorting inhomogeneities of said medium, and transmitting another beam of coherent radiation to be incident upon the reverse side of the recording surface antiparallel to the direction of incidence of said reference beam with respect to said recording surface, a conjugate image diffraction order of said radiation being transmitted through said surface and through said medium to compensate for said distorting inhomogeneities.

8. A method according to claim 7 in which
the first transmitting step comprises transmitting the beam as a pilot beam from a first communicating station including an aperture as the object specimen to a second communicating station including the recording surface, and
the second transmitting step comprises transmitting the other beam of radiation to be incident upon the reverse side of the recording surface antiparallel to the direction of incidence of said reference beam with respect to said recording surface, a conjugate image diffraction order to said radiation being transmitted through said surface and through said medium to pass substantially through said aperture.

9. A method according to claim 8 in which a first communicating station includes a first aperture as the aforesaid object specimen and includes a first recording surface and a second communicating station includes a second aperture and a second recording surface as the aforesaid recording surface and in which,
the second transmitting step comprises transmitting the other beam of coherent radiation as a pilot beam incident upon the reverse side of the second recording surface antiparallel to the direction of incidence of the reference beam with respect to said second recording suface, a conjugate image diffraction order of said radiation being transmitted through said surface and through said medium to pass through said first aperture, and
including the additional steps of
recording at said first recording surface an interference fringe pattern produced by said conjugate image diffraction order and a local reference beam coherent with said diffraction order and propagated at an acute angle with respect thereto to represent said second aperture, some inhomogeneities of said medium, and some diffraction characteristics of the second aperture,
retransmitting the first beam of coherent radiation as a pilot beam incident upon the reverse side of the first recording surface antiparallel to the direction of incidence of the reference beam with respect to said first recording surface, a conjugate image diffraction order of said radiation being transmitted through said surface and through said medium to pass through said second aperture,
recording at said second recording surface an interference fringe pattern produced by the last said conjugate image diffraction order and a local reference beam coherent with said diffraction order and propagated at an acute angle with respect thereto to represent the first aperture, some inhomogeneities of said medium and some diffraction characteristics of the first aperture,
transmitting message-modulated beams between the first and second stations to be incident upon the reverse side of the last-made record at the transmitting station antiparallel to the direction of incidence of the local reference beam with respect to said recording surface, conjugate image diffraction orders of said message-modulated beams being transmitted through said last-made record and through said medium to pass through the aperture of the receiving station.

10. A method according to claim 7 in which
the first transmitting step includes pulsing the beam of coherent radiation and transmitting it from a first communicating station including an aperture as the object specimen to a second communicating station including the recording surface through the medium,
the recording step includes discriminating a main component of the beam from an echo component thereof and recording at the recording surface an interference fringe pattern produced from the main component and a pulsed local reference beam but not the echo component, the pulsed local reference beam being coherent with and propagated at an acute angle with respect to said transmitted beam, and
the second transmitting step comprises transmitting a message-modulated beam of radiation to be incident upon the reverse side of the recording surface antiparallel to the direction of incidence of said reference beam with respect to said recording surface, a conjugate image diffraction order of said radiation being transmitted through said recording surface and by paths excluding echo ray paths through said medium to pass through said aperture.

11. A method according to claim 7 in which
the first transmitting step includes transmitting the beam from a two-dimensional information display as the object specimen to the recording surface through a first scrambling element as the inhomogeneous medium, and
the second transmitting step comprises transmitting an unmodulated beam of coherent radiation to be incident upon the revrese side of the recording surface antiparallel to the direction of incidence of the reference beam with respect to said recording surface, a conjugate image diffraction order of said radiation being transmitted through said recording surface and through a second scrambling element substantially identical to the first scrambling element and disposed in substantially identical manner with respect to the recording surface, said wavefront upon passing through said second scrambling element forming a reconstructed image of said information display.

12. A method according to claim 7 in which
the first transmitting step comprises transmitting the beam as a pulsed beam from an aperture of a probing apparatus through the medium to be reflected from a reflecting object back through the medium and the aperture to the recording surface,
the recording step comprises reversibly recording at said recording surface the interference pattern produced by the transmitted beam and the local reference beam to represent the aperture, the reflecting object and the distortions produced by said medium, and
the second transmitting step comprises transmitting a pulsed beam of coherent radiation to be incident upon the reverse side of the recording surface in a direction antiparallel to the direction of incidence of the reference beam with respect to the recording surface, a conjugate image diffraction order of said radiation being transmitted through the recording surface and through said aperture and said medium toward said object to be reflected therefrom and returned through said medium and said aperture.

13. A system adapted for transmitting radiation through a transmission medium, comprising an object specimen and a recording surface separated by said transmission medium,
means for transmitting from said object specimen to said recording surface a beam of coherent radiation through said medium,
means for recording at said recording surface a wavefront produced from said beam to represent the object specimen and some distorting inhomogeneities of said medium, and
means for transmitting another beam of coherent radiation to strike the recording surface in a direction that directs a wavefront corresponding to a conjugate image of said original surface through said medium to compensate for said distorting inhomogeneities.

14. A system adapted for transmitting radiation through an inhomogeneous medium, comprising an object specimen and a recording surface separated by said inhomogeneous medium, means for transmitting from said original surface to said recording surface a beam of coherent radiation through said medium, means in proximity to said recording surface for producing a reference beam coherent with said transmitted beam and propagated at an acute angle with respect thereto, means for recording at said recording surface an interference fringe pattern produced from said transmitted beam and said reference beam to represent the object specimen and some distorting inhomogeneities of said medium, and means for transmitting another beam of coherent radiation to be incident upon the reverse side of the recording surface antiparallel to the direction of incidence of said reference beam with respect to said recording surface, a conjugate image diffraction order of said radiation being transmitted through said recording surface and through said medium to compensate for said distorting inhomogeneities.

15. A system for communicating through an inhomogeneous medium, comprising first and second stations including first and second sources of coherent radiation, respectively, first and second radiation-recording media, respectively, and first and second apertures, respectively;

means for directing radiation from said first source as a pilot beam through said first aperture and said medium toward said second station, means for making radiation from said second source coherent with radiation from said first source received through said second aperture, means for directing radiation from said second source toward second recording medium at an acute angle with respect to said received radiation to expose said medium and record an interference pattern, and means for directing radiation from said second source toward said second recording medium antiparallel to its direction during exposure, whereby a conjugate second aperture, said medium, and said first aperture in tandem.

16. A system according to claim 15 in which the means for directing radiation from the first source as a pilot beam includes means for pulsing the radiation from the first source, and the means for directing radiation from said second source toward said second recording medium at an acute angle with respect to the received radiation includes means for pulsing the radiation from the second source in response to a level of said received radiation exceeding a threshold level.

17. A system for privately communicating, comprising a scrambling element having a substantially inhomogeneous composition, means for displaying information in two dimensions in comprehensible form, a first source of coherent radiation, means for diffusely illuminating said displaying means with radiation from said first source in a direction that permits a portion of said illuminating radiation thereafter to pass through said scrambling element, means for directing reference radiation coherent with said illuminating radiation at an acute angle with respect to the radiation passed through the scrambling element to produce an interference fringe pattern therewith, means for recording said interference fringe pattern, said recording means having a side upon which the aforesaid radiations are incident and a reverse side, means for directing coherent radiation upon said reverse side of said recording means in a direction that produces the conjugate image diffraction order, a scrambling element substantially identical to the aforesaid scrambling element disposed to intercept said conjugate image diffraction order, said identical element being oriented with respect to said recording means substantially as the first scrambling medium was oriented with respect to said recording means.

18. A system for probing with radiation transmitted and reflected through an inhomogeneous medium, comprising a first source of coherent radiation, an aperture through which said radiation can be transmitted or received, means for directing said radiation from said source through said aperture into said medium, where a portion of said radiation may be reflected by an object back toward said aperture, means for directing reference radiation coherent with the reflected radiation received through said aperture at an acute angle with respect thereto to produce an interference fringe pattern, means for recording said interference fringe pattern, means for directing coherent radiation in reverse upon said recording means antiparallel to said reference radiation to direct a conjugate image diffraction order of radiation through said aperture into said medium where a portion of said conjugate image diffraction order of radiation may again be reflected by said object back toward said aperture, and means for detecting the reflected radiation passed through said aperture.

19. A system according to claim 18 in which the recording means includes an automatically reversible radiation-responsive material biased by the reference radiation above the threshold of the radiation response characteristic, whereby the reflected radiation passed through the aperture is effective to produce incremental variations of the radiation transmission characteristics of said radiation-responsive material.

20. A system for communicating through an inhomogeneous medium, comprising first and second stations including first and second ring lasers, respectively, first and second photographic media, respectively, and first and second collecting lenses, respectively;

each of said ring lasers being provided with means for controlling the direction of unidirectional traveling wave oscillation and means for modulating said unidirectional traveling-wave oscillation, each of said ring lasers including means for mounting said photographic media within said respective ring lasers, each of said ring lasers including means for phase locking one said unidirectional traveling-wave oscillation in response to radiation collected by said respective lens, and each of said first and second stations including respective first and second means for demodulating modulated radiations collected by said respective lens.

21. A system for communicating through an inhomogeneous medium, comprising first and second stations including first and second ring lasers, respectively, first and second photographic media, respectively, and first and second collecting lenses, respectively;

each of said ring lasers including an isolator and a reversing signal source coupled to said isolator to control the direction of unidirectional traveling-wave oscillation and a modulator and a signal source coupled to said modulator to modulate said unidirectional traveling-wave oscillation; each of said ring lasers including means for reflecting a portion of one said unidirectional traveling-wave oscillation through the respective said first lens and said inhomogeneous medium toward the other said lens;

each of said ring lasers including a phase lock circuit adapted to make said one unidirectional traveling-wave oscillation coherent with radiation received from the said other station, said respective photographic medium being mounted in said mounting means to record an interference fringe pattern;

each of said stations including a modulator and a signal source coupled to said modulator to modulate the other said unidirectional traveling-wave oscillation, said other oscillation being diffractable in part by said photographic medium, when developed, to direct a conjugate image diffraction order through the respective said lens, the inhomogeneous medium and the other said lens, and each of said lasers including means for demodulating modulated radiation received from the other station.

22. A system according to claim 21 in which each of the stations including a threshold circuit coupled to the modulator to permit the existence of the said one unidirectional traveling-wave oscillation when the intensity of received radiation at said threshold circuit exceeds a threshold intensity, and each of the stations further includes a shutter disposed before the photographic medium and connected to said threshold circuit to be opened when the intensity of received radiation at said threshold circuit exceeds a threshold level.

23. A system for privately communicating, comprising a first scrambling element having a substantially inhomogeneous composition;

a photographic transparency displaying information in two dimensions;

a diffusing element disposed on the opposite side of said transparency from said scrambling element;

a first laser capable of providing essentially monochromatic coherent light, a first portion of said light being directed in successive order through said diffusing element, said transparency and said scrambling element and a second portion of said light being directed to propagate at an acute angle with respect to said first portions, said first and second portions intersecting after said first portion leaves said scrambling element to form an interference fringe pattern;

a previously unexposed photographic medium disposed to be exposed to said interference fringe pattern;

a second scrambling element substantially identical to said first scrambling element;

means for disposing said photographic medium or a duplicate thereof, after development, in exactly the same position with respect to said second scrambling element or said first scrambling element as said photographic medium was disposed, when exposed, with respect to said first scrambling element;

a second laser capable of providing essentially monochromatic coherent light, said light being directed upon said photographic medium from the side opposite the side illuminated during exposure and antiparallel to the direction of incidence of said second portion of light.

24. A system for the transmission of optical radiation precompensated for some distortions of an inhomogeneous transmission medium, comprising a first laser a transparent medium including a reversible dye, means for mounting said transparent medium to receive radiation from said first laser, a lens disposed to gather radiation and direct it upon said transparent medium, a phase-lock circuit responsive to said gathered radiation and to radiation from said first laser, said phase-lock circuit being effective to mke said radiations coherent, an interference fringe pattern being formed in said reversible dye, means for directing coherent radiation upon said transparent medium antiparallel to the direction of the aforesaid phase-locked radiation directed thereon from said first laser, the antiparallel radiation tending to wash out the interference fringe pattern while said interference fringe pattern is directing the conjugate image diffraction order of said antiparallel radiation in reverse along the path of the gathered radiation, and a photodetector disposed to detect optical radiation gathered by said lens.

25. A system according to claim 24 in which the first laser is a ring laser and the directing means include an optical isolator and a signal source coupled to said isolator to control the direction of unidirectional traveling wave oscillation in said laser in response to the state of received radiation.

26. A system according to claim 24 in which the reversible dye has a response threshold, said system including a second laser noncoherent with the first laser, the combined intensities of the first and second lasers biasing said photochromic dye above said response threshold.

References Cited

UNITED STATES PATENTS 2,982,176 5/1961 Kay.

OTHER REFERENCES

E.M. Leith et al., Journal of the Optical Society of America, Reconstructed Wavefronts and Communication Theory, Oct. 16, 1961, pp. 1123–1130.

ROBERT L. GRIFFIN, *Primary Examiner.*

A. MAYER, *Assistant Examiner.*

U.S. Cl. X.R.

350—3.5

UNITED STATES PATENT OFFICE
CERTIFICATE OF CORRECTION

Patent No. 3,449,577 June 10, 1969

Herwig W. Kogelnik

It is certified that error appears in the above identified patent and that said Letters Patent are hereby corrected as shown below:

Column 1, line 14, beginning with "The distortions" cancel all to and including "conjugate image." in line 20, same column 1, and insert:

ABSTRACT OF THE DISCLOSURE

A hologram is formed of a first wavefront transmitted through an inhomogeneous transmission medium. By illuminating the hologram from the opposite side, a second wavefront corresponding to the conjugate of the first wavefront is transmitted back through the inhomogeneous medium; and as a result the distortions of the inhomogeneous medium are compensated for. This improvement in transmission efficiency can also be made iteratively; and echoes can be reduced by pulsed operation. Another embodiment uses planned scrambling by an inhomogeneous transmission medium and subsequent unscrambling to provide private communication.

same column 1, line 50, "of", second occurrence, should read -- by --. Column 3, line 30, "because" should read -- where --. Column 5, line 17, cancel ", now abandoned"; line 51, cancel "now abandoned,". Column 6, line 39, after "article" insert -- in the Journal of the Optical Society of America --; line 50, equation (2) should appear as shown below:

$$U_o = a_o e^{-ik_1 r_2 (x_2 y_2)}$$

same column 6, lines 69 and 70, "$U_o{*}U$", each occurrence, should read -- $U_o^*U$ --. Column 8, line 29, "found" should read -- formed --. Column 14, line 19, "182" should read -- 181 --; line 68, "by" should read -- of --. Column 15, line 33, "surface" should read -- object specimen --. Column 21, line 22, "including" should read -- includes --.

Signed and sealed this 28th day of April 1970.

(SEAL)
Attest:

EDWARD M.FLETCHER,JR.
Attesting Officer

WILLIAM E. SCHUYLER, JR.
Commissioner of Patents